March 26, 1968 G. SALMET 3,375,445

DEVICE FOR DISTORTION, REDUCTION IN A PPM RECEIVER

Filed Nov. 10, 1964

INVENTOR.
GASTON SALMET
BY
Frank R Trifari
AGENT 3,375,445
DEVICE FOR DISTORTION REDUCTION IN A PPM RECEIVER Gaston Salmet, St. Maur, France, assignor to North American Philips Company, Inc., New York, N.Y., a corporation of Delaware Filed Nov. 10, 1964, Ser. No. 410,145
9 Claims. (Cl. 325—324)

ABSTRACT OF THE DISCLOSURE

The effect of interference is reduced in a pulse code modulation receiver by providing means for gating the output of a pulse demodulator to an output circuit only when the input does not include pulses that are spaced too closely. In a pulse position modulation system in which the input pulses pass through a gate opened only at intervals during which a pulse is expected, a detector circuit is provided for detecting the occurrence of multiple pulses during the interval, and the detector circuit produces a control signal for inhibiting gating of the demodulator output in the event of multiple pulses.

The invention relates to a device for receiving signals transmitted by pulse modulation, principally pulse position modulation, in particular in a system for radio transmission, in which the mutual communication between the various stations is effected by modulation of pulses in approximately the same frequency band. Each of the receiving stations is provided with a receiver gate which is released at the time intervals at which a pulse destined for it is expected.

Such devices may advantageously be used in radio transmission systems of the "Radas" type, (Random Access Discrete Address) in particular for use for communication between a great number of mobile stations without the intermediate connection of a central station. The mutual locking of the connection between two stations is effected by co-transmitting address pulses with the signal pulses simultaneously and continuously. Such "Radas" transmission system have been described, for example, in "IRE Transactions on Vehicular Communications," August 1961, pp. 40–44, as well as in the copending patent application Ser. No. 359,858, filed Apr. 15, 1964, in which the communication takes place by the use of delta modulation.

With respect to the freedom from distortion, delta modulation has the advantage as compared with pulse position modulation that the release duration of the receiver gate can be made shorter, for example, by a factor 3, since as a matter of fact in delta modulation the signal pulses which characterize the transmitted signal by their presence and absence, substantially coincide with a series of equidistant pulses. On the contrary, the recurrence frequency of the release instants of the receiver gate in the case of delta modulation is higher by a factor than in case of pulse position modulation. For example, this recurrence frequency of the release instants in the case of delta modulation is at least 30 kc./s. and only 9 kc./s. in the case of pulse position modulation. It appeared that both effects compensate each other substantially, so that from the point of view of freedom from distortion, both modes of modulation are substantially equal.

It is the object of the invention to provide an effective improvement of the freedom from distortion in a device for receiving signals, mainly while using pulse position modulation.

According to the invention a normally cut-off gate circuit with a memory network is connected to the output of the pulse demodulator which demodulates the received pulses. The gate circuit is released by means of a control circuit for a short period after each received pulse. The device further comprises a cut-off device provided with a detector of average value fed by the pulses received. The output of the detector prevents the release of the gate circuit by the control circuit when more than one pulse falls within the release interval of the receiving device.

In order that the invention may readily be carried into effect, it will now be described more fully, by way of example, with reference to the accompanying drawing, in which, FIG. 1 shows a device according to the invention in a Radas station.

Figure 1:
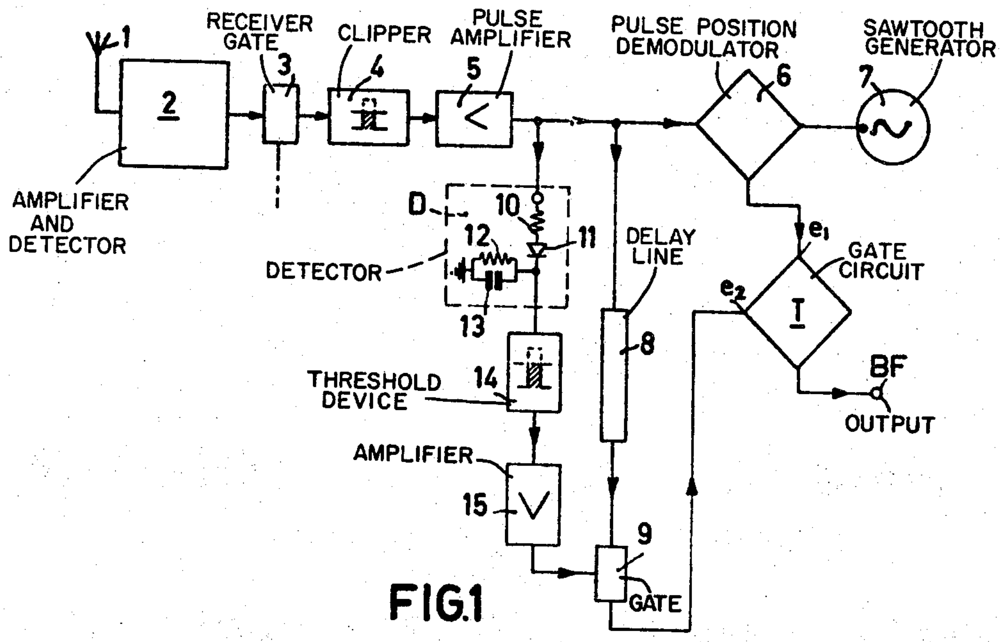

Referring now to FIG. 1, the position-modulated pulses received by an aerial 1 of a receiving device in a Radas station are supplied, after high-frequency amplification and detection in a stage 2, to a receiver gate 3 which is released during each time interval at which a pulse destined for it is expected. For controlling this gate, as well as the control circuit used, reference may be made, for example, to the patent application Ser. No. 359,858. After (or before) the gate 3 a pulse repeater in the form of a clipper 4 is arranged. The output of the gate 3 is applied to a pulse position demodulator 6 by way of pulse amplifier 5. A sawtooth voltage of a sawtooth generator 7 is also applied for demodulating the position-modulated pulses as described, for example, in French patent specification 1,079,958 of Apr. 10, 1951.

To improve the freedom from distortion, the output of the pulse position demodulator 6 is connected to the input $e_1$ of a normally cut-off gate circuit T which is further provided with a memory network. The construction of the gate circuit T will be described hereinafter.

In addition, two channels are connected to the output of the amplifier 5. In the first channel a delay line 8 (which in the present case causes a delay of 6 μsec.) is included succeeded by a gate 9. In this case, the first channel serves as a control circuit for the gate circuit T. The pulses which are delayed in the delay line 8 and pass the gate 9 cause a release of the gate circuit T. As a result the demodulated signal stored in the memory network of the gate circuit T is applied to the output BF of the gate circuit T.

The second channel serves as a cut-off device for the gate 9 and comprises successively an average value detector D constituted by the series arrangement of a resistor 10 and a rectifier 11 with a detection capacitor 13 shunted by a resistor 12, a threshold device 14 and a direct voltage amplifier 15. The output circuit of amplifier 15 is connected to the gate 9. In this case the time constant of the detector of average value is small with respect to the recurrence frequency of the pulses received, but is large with respect to the duration of the pulses and the delay time of the delay line 8. If, for example, in the present embodiment the recurrence period of the pulses is 90 to 100 μsec., the duration of the pulses is 0.8 μsec., the delay time of the delay line 8 is 6 μsec. and the release interval of the gate 3 is 2.4 μsec., then the time constant of the detector D of average value is chosen to be approximately 30 μsec., while the threshold level of the threshold device 14 is adjusted so that it supplies a cut-off voltage for the gate 9 only if more than one pulse falls within the release interval of the gate 3.

If in a device described so far a single pulse is passed in the release interval, this pulse is demodulated in the pulse position demodulator 6 and, after delay in the delay line 8, can pass the gate 9. This pulse releases the gate circuit T and the demodulated signal is applied to the output BF. If, on the contrary, more than one pulse occurs in the release interval, the cut-off device D supplies a cut-off voltage for the gate 9 to 14, 15, as a result of which no release pulse for the gate circuit T occurs and no signal is applied to the output BF. Thus, a voltage will be applied to the output BF of the gate circuit T only when a single pulse occurs in the release interval.

Figure 2:
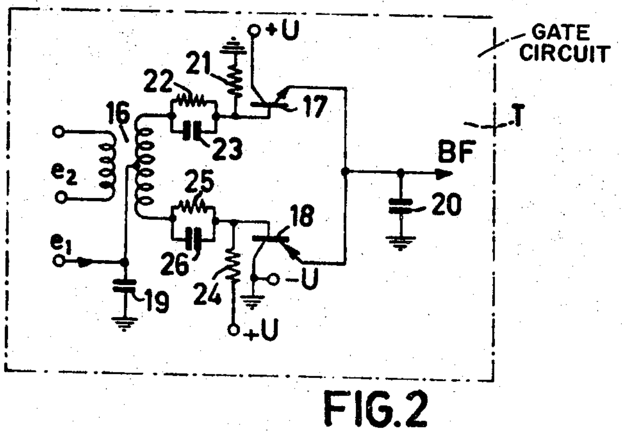
FIG. 2 is the circuit diagram of a gate circuit used in a device shown in FIG. 1.

FIG. 2 shows in greater detail the construction of the gate circuit T. It comprises a transformer 16 which supplies two transistors 17, 18 (of opposite conductivity types), these transistors being suitably polarized by resistance-capacitance networks 21, 22, 23; 24, 25, 26 and a cut-off voltage U. Transistors 17, 18 can supply signals of opposite polarities when being released. The input pulse supplied by the pulse position demodulator 6 in this case charges a capacitor 19, for the time being without result, however, since, in order to produce an output signal at the output BF (which is shunted by a capacitor 20) it is necessary that the transistors 17 and 18, the emitters of which are connected to the said output, are released by signals of opposite polarities. This is effected 6 $\mu$sec. later when a pulse is applied at $e_2$ to the output of the primary of the transformer 16. When this pulse is not applied, the capacitor 20 will not receive new charge and the previous voltage value will be maintained.

A practical embodiment of the invention included the following components:

| | |
|---|---|
| Transistor 17 | Type 2N1613 |
| Transistor 18 | Type 2N1991 |
| Resistors 22 and 25 | 33KΩ |
| Capacitors 23 and 26 | pf__ 4700 |
| Resistor 21 | 100KΩ |
| Resistor 24 | 220KΩ |
| Capacitor 19 | pf__ 1000 |
| Capacitor 20 | pf__ 2200 |
| Voltage U | 12 |

Figure 3:
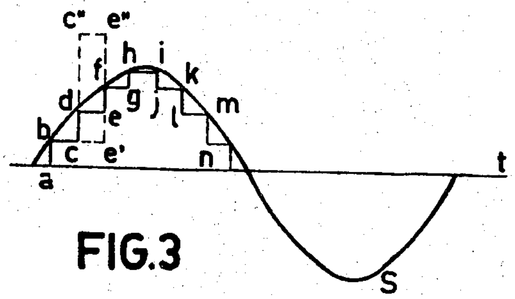
FIG. 3 is a time diagram for explaining the device according to the invention.

In order to explain the operation of the device according to the invention, FIG. 3 shows a time diagram in which the waveform of a demodulated speech signal $s$ is plotted as a function of the time $t$, the said signal being normally formed by a stepped signal a b c d e f g h i j k l m. If an interference signal occurs at $de$, the signal at $ce'$ (shown in broken lines) will be maintained and given its correct value only at $f$. Without the device according to the invention on the contrary a signal a b c c'' e'' f g . . . would have been obtained, from which it appears that the influence of interference is considerably greater. The important advantage of the device according to the invention, which can also be demonstrated mathematically, is that the influence of interference is proportional to the modulation which means that in case of small modulation the influence of interference also is small. In this manner a particularly effective reduction in interference is obtained.

For completeness' sake the following data are given for the average value detector D:

| | |
|---|---|
| Resistor 10 | ohms__ 470 |
| Rectifier 11 | Type OA85 |
| Resistor 12 | 1KΩ |
| Capacitor 13 | pf__ 40,000 |

The invention is not restricted to the above embodiment and comprises all variations. It will be clear for example that the above invention, which has been described with reference to pulse position modulation, is not restricted to this type of modulation.

What is claimed is:

1. In a receiver for receiving coded signals in the form of recurrent pulses, said receiver being of the type comprising a source of said signals, pulse code demodulator means, first gate means for applying said signals to said demodulator at predetermined intervals corresponding to the expected time of arrival of pulses in said signal, an output circuit, and means applying the output of said demodulator means to said output circuit; the improvement wherein said means applying the output of said demodulator means to said output circuit comprises normally cut-off second gate means, said second gate means including memory means for storing output signals from said demodulator means, delay means responsive to input pulses applied to said demoulator means for opening said second gate means, whereby signals stored in said memory means are applied to said output circuit, and means responsive to the occurrence of multiple pulses passing said first gate means during said intervals connected to inhibit opening of said second gate means, whereby signals stored in said memory means are not applied to said output circuit for any interval during which multiple pulses have been received.

2. A receiver for receiving coded signals in the form of recurrent pulses, said receiver being of the type comprising a source of said signals, pulse demodulator means, and first gate means connected to apply said signals to said demodulator means only at intervals of expected arrival of pulses of said signal; wherein the improvement comprises second normally cut-off gate means, means connecting said second gate means to the output of said demodulator means, said second gate means including an output circuit, and memory means for storing output signals from said demodulator means, delay means responsive to output signals from said first gate means and connected to open said second gate means a predetermined time after the passage of a pulse by said first gate means, whereby signals stored by said memory means are applied to said output circuit, detector circuit means for producing a control signal corresponding to the average of the output of said first gate means, and means responsive to said control signal when it exceeds a predetermined value for inhibiting opening of said second gate means by said delay means.

3. A receiver for receiving coded signals in the form of recurrent pulses, said receiver being of the type comprising a source of input signals, pulse demodulator means, input gate means connected to apply said input signals to said demodulator means only at intervals of expected arrival of pulses of said input signals, an output circuit, and means connecting the output of said demodulator means to said output circuit; wherein the improvement comprises detector means for producing an output responsive to the average value of signals passing said input gate means, threshold means for producing a control signal when the output of said detector means exceeds a predetermined value, delay circuit means for producing a delayed signal corresponding to said signals passing said input gate, said means connecting the output of said demodulator means to said output circuit comprising memory means for storing output signals of said demodulator means and normally closed gate means for applying signals stored in said memory means to said output circuit, said receiver further comprising means applying said delayed signal to said normally closed gate means for opening said normally closed gate means, and means for applying said control signal to said delay circuit means for inhibiting application of said delayed signal to said normally closed gate means.

4. The receiver of claim 3 wherein said detector means has a time constant that is large with respect to the duration of pulses of said input signals and small with respect to the recurrence period of pulses of said input signals.

5. The receiver of claim 3 wherein said detector means comprises a series branch of a resistor and rectifier, and an output shunt branch of a parallel connected resistor and capacitor.

6. The receiver of claim 3 wherein said threshold means comprises means for producing said control signal only when more then one pulse passes said first gate means during an interval when said first gate means is open.

7. The receiver of claim 3 wherein said delay circuit means comprises a series connected delay line and normally open gate circuit, and means for applying said control signal to said last mentioned gate means for closing said last mentioned gate means.

8. The receiver of claim 3 wherein said normally closed gate means comprises first and second transistors of opposite conductivity type, means for biasing said transistors to cut-off means connecting the outputs of said transistors to said output circuit, and means for applying said delayed signals to the inputs of said transistors for rendering them conductive, and said memory means comprises a capacitor connected to the inputs of said transistors.

9. A receiver for pulse position modulated signals of the type comprising a pulse position demodulator circuit and a receiver gate for applying said modulated signals to said demodulator circuit only at intervals when a pulse of said modulated signals is expected; said receiver comprising a capacitor, means connecting said capacitor to the output of said demodulator circuit for storing output signals, an output circuit, a normally closed first gate connected between said capacitor and output circuit, a first series circuit comprising delay means and a normally open second gate connected between the input of said demodulator circuit and the control circuit of said first gate whereby said first gate is opened with a predetermined delay by pulses appearing at the input of said demodulator circuit for applying the voltage across said capacitor to said output circuit, a second series circuit comprising a detector and a threshold circuit connected in that order between the input of said demodulator circuit and the control circuit of said second gate, said detector having a time constant that is large with respect to the width of pulses of said modulator signals and small with respect to the recurrence period of said pulses of said modulated signal, said threshold circuit having a threshold level to produce a control signal only when more than one pulse is detected by said detector in an interval when said receiver gate is open, whereby said control signal closes said second gate to inhibit opening of said first gate for any interval during which more than one pulse passes said receiver gate.

References Cited

UNITED STATES PATENTS

| | | | |
|---|---|---|---|
| 2,879,504 | 3/1959 | Howell et al. ----- | 325—322 X |
| 3,218,556 | 11/1965 | Chisholm --------- | 325—324 X |

ROBERT L. GRIFFIN, *Primary Examiner.*

JOHN W. CALDWELL, *Examiner.*

J. T. STRATMAN, *Assistant Examiner.*